Nov. 24, 1959  J. L. BARTH  2,913,820
LUBRICATION DEVICE AND METHOD OF MAKING SAME
Filed April 23, 1956
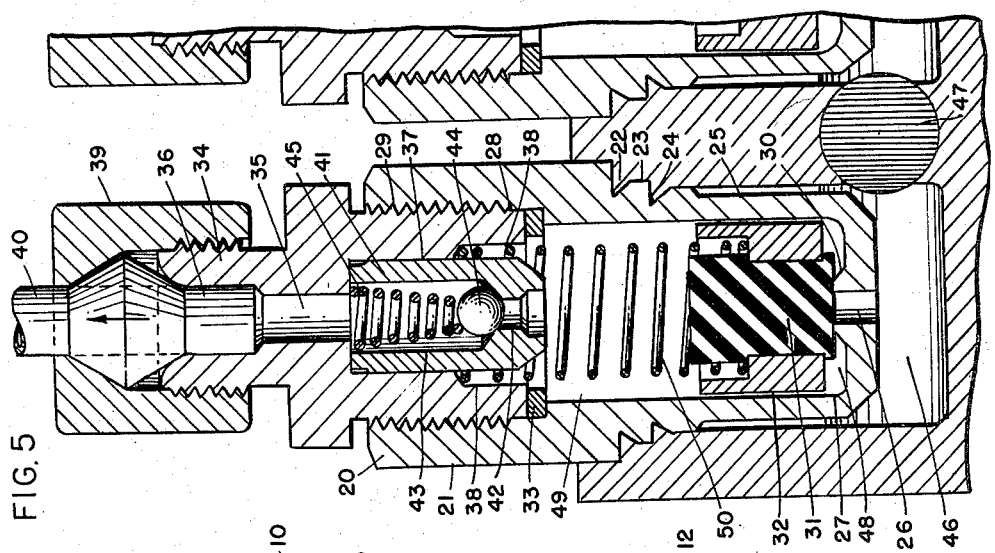
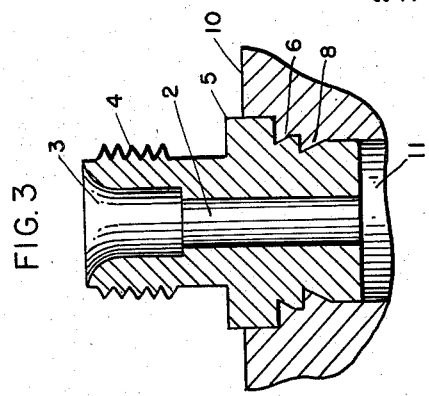
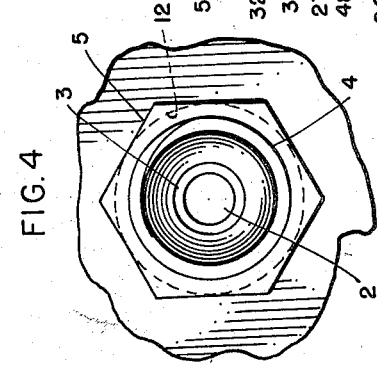
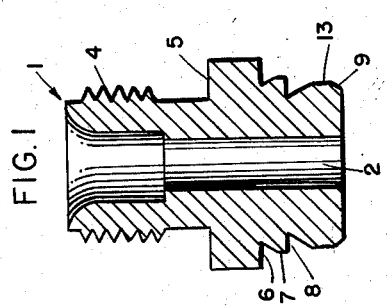
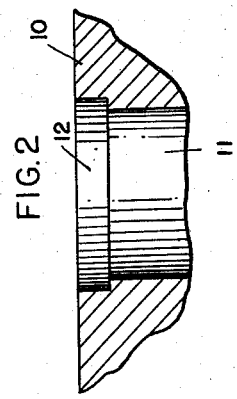
INVENTOR:
JOHN L. BARTH
BY
ATTORNEY United States Patent Office 2,913,820
Patented Nov. 24, 1959

2,913,820

LUBRICATION DEVICE AND METHOD OF MAKING SAME

John L. Barth, Chicago, Ill., assignor to Stewart-Warner Corporation, Chicago, Ill., a corporation of Virginia Application April 23, 1956, Serial No. 580,072

4 Claims. (Cl. 29—521)

This invention relates to improvements in lubrication fittings and to improvements in the method of securing fittings to a supporting member.

At a very early stage in the lubrication fitting art, attempts were made to gain economy in the assembly of fittings to a supporting member by press fitting a shank portion of the fitting into a supporting member bore slightly smaller in diameter. This proved to be feasible for low pressure applications only and for high pressure applications if it was necessary to screw a threaded fitting into a threaded bore. Later Watson disclosed in U.S. Patent No. 2,025,223 a method whereby a special tool swaged material surrounding the bore into a recess formed in the shank of the fitting to rigidly secure said fitting to the supporting member. This effectively resisted axial movement of the fitting in high pressure systems, for example, up to ten thousand pounds per square inch. At about the same time, Dodge disclosed in Patents No. 2,025,224 and 1,996,795 a significant improvement over Watson by providing a cutting shoulder on the inner end of the fitting shank to swage material into a shank groove immediately adjacent the shoulder, whereby it was possible to secure the fitting to the supporting member without a special swaging tool.

A modification of the Dodge method was disclosed by Creveling in Patent No. 1,974,150 in which an annular shoulder swaged material into a threaded shank portion of the fitting to accomplish a greater sealing area and to provide a threaded portion in the bore, whereby the fitting might easily be removed by unscrewing it from the bore. Thomas disclosed in Patents 2,154,116 and 2,254,502 and Creveling in Patent 2,126,452 further modifications.

However, in all of the above said patents the fitting was of the type in which a lubricant pump connection was pushed axially on the fitting to fill the fitting with lubricant. Obviously this resulted in no torque being applied to the fitting to cause rotation thereof. Consequently, none of these fittings provided substantial resistance to a torque applied thereto, and they were inadequate for any use in which resistance to torque is necessary.

It is the primary object of the present invention to provide a means and method whereby a fitting, secured to a supporting member, forms a connection comparable to yet more economical than a single unitary structure, in which the fitting offers great resistance to both axial and rotary movement and provides a strong and effective seal between itself and the supporting member.

The applicant herein proposes as a primary feature to provide a fitting having an annular shoulder on its shank to swage material from a supporting member into a first groove immediately adjacent thereto in much the same manner as that disclosed by Dodge Patent No. 1,996,795 (Fig. 2) and having a polygonal shoulder which imbeds itself in the supporting member and swages material into a second groove in said shoulder immediately adjacent to said polygonal portion, whereby said annular shoulder provides a uniform circumferential flow into the first groove to provide a tight seal and substantial resistance axial movement due to high pressure and whereby the corners of said polygonal portion imbedded in the supporting member provide substantial resistance to rotary movement as well as to swage material into said second groove to provide additional resistance to high pressure within the fitting and supporting member.

Another primary but inherently related object is to provide a more economical method and means for securing a plurality of lubricant measuring valves to a manifold block.

A feature of the present invention is the provision of the means and method for economically press fitting two elements together to form a structure which has the strength characteristics similar to a unitary structure such as one cast in, or machined from, one piece.

Other objects and features will be apparent upon a perusal of the following description in which:

Fig. 1 is a sectional view of the fitting of the type contemplated by the present invention;

Fig. 2 shows a fragmentary section of a member adapted to receive the fitting shown in Fig. 1;

Fig. 3 is a sectional view of the fitting of Fig. 1 secured in the member of Fig. 2;

Fig. 4 is a plan view of the fitting and member; and

Fig. 5 is a sectional view of a lubrication measuring valve and supporting member utilizing the features of the present invention.

The fitting 1 (Fig. 1) has an axial bore 2 and counter-bore 3 therein for passage of fluid therethrough. The upper portion 4 is threaded to receive a complementary coupling. Somewhat below the threaded section 4 is a hexagonal shoulder 5, the lower edge of which provides a cutting edge. Immediately below the hexagonal portion 5 is a first annular groove 6 below which is disposed an annular cutting shoulder 7 and a second annular groove 8. The fitting preferably is tapered at its lower end 9.

The supporting member 10 (Fig. 2) has a bore 11 slightly smaller in diameter than the cutting shoulder 7 of fitting 1. Member 10 also has a counterbore 12, preferably of a diameter equal to the distance between diagonally opposite sides of the hexagonal shoulder 5 of fitting 1. The shank portion 13 is slightly smaller in diameter than bore 11 so that it is not necessary to exert substantial pressure on fitting 1 to insert portion 13 into bore 11. The tapered end 9 makes manual insertion of portion 13 into bore 11 much easier.

As cutting shoulder 7 is forced into bore 11, it swages material around the periphery of bore 11 into groove 8 to make a strong tight seal between fitting 1 and member 10 to resist axial force placed on fitting 1 when used in a pressure lubricating system. While shoulder 7 is swaging material into groove 8, the hexagonal shoulder 5 is simultaneously swaging material around the periphery of counterbore 12 into groove 6. It is apparent that the sides and corners of hexagonal shoulder 5 firmly imbed themselves into the material surrounding counter-bore 12 to resist any torque applied to fitting 1—e.g. when a coupling is tightly threaded on the upper portion 4 of fitting 1.

Fig. 5 shows a measuring valve construction secured to a manifold block. The main body 20 has a hexagonal upper portion 21 below which is an annular groove 22 followed respectively by an annular cutting shoulder 23, an annular groove 24 and a shank portion 25. Said body 20 is provided with an axial bore 26, a first counter-bore 27, a second counter-bore 28 and an upper internally threaded section 29. An axial conically shaped valve seat 30 is formed at the bottom of body 20. A cylindrical rubber valve 31 has an annular metal supporting member 32 secured therearound, said supporting member being slightly smaller in diameter than counterbore 27 (exaggerated in Fig. 5 for ease of description) to permit fluid to pass between its outer periphery and the inner periphery of counter-bore 27 for purposes to be described below. A suitable gasket 33 is disposed at the bottom of counter-bore 28.

A screw 34 is received by the threaded portion 29 of body 20. Screw 34 has an axial bore 35 with a counter-bore 36 at the upper end, and counterbores 37 and 38 at the lower end. A spring 50 abutting against the upper end of counter-bore 38 urges valve 31 downwardly toward its seat 30. The upper end of screw 34 is externally threaded to receive a suitable coupling nut 39 having tubing 40 which extends to the bearing surface (not shown) to be lubricated.

A cylindrical valve seat 41 is press-fit into counter-bore 37 of screw 34. Valve seat 41 has an annular bore 42 above which is a counterbore 43 which provides a seat for a valve check ball 44. A biasing spring 45 urges check ball 44 toward the seat at the lower end of counter-bore 43.

The manner in which the measuring valve shown in Fig. 5 operates is well known in the art and will be described only briefly. Lubricating fluid is forced under pressure into chamber 46 by way of passageway 47. As the pressure in chamber 46 rises, it will reach a predetermined pressure which will exert sufficient upward force on that portion of rubber valve 31 covering bore 26 to lift the valve off seat 30. Immediately, fluid under said predetermined pressure fills chamber 48 to exert a force over the entire lower surface of valve 31 and the metal supporting member 32 to move the valve and member upwardly with a snap-action to force lubricant already in chamber 49 (above valve 31) through bore 42 to lift check ball 44 off its seat to permit fluid to flow into tubing 40 and thence to the bearing. After sufficient time lapse, the pressure on the fluid in passageway 47 is relieved and spring 50 will urge valve 31 and its support 32 downwardly to seat 30. The fluid which accumulated in chamber 48 below valve 31 as it was forced upwardly now flows between the inner periphery of counterbore 27 and the outer periphery of supporting member 32 into chamber 49 in preparation for the next cycle of operation.

Conventional measuring valve manifold block applications in use today are more expensive. For example, if body 20 (Fig. 5) were screwed into a manifold block, it would be necessary to perform additional threading operations on the body 20 and the manifold block. The body 20 would present no resistance to torque in one direction. It would also be necessary to provide a gasket for sealing and to space adjacent fittings further apart to permit screwing the fittings into the manifold block.

In other types, the measuring valve seat and walls are machined in the manifold block itself, but the height of the block is necessarily increased from 50 to 100 percent resulting in high cost.

It is to be understood that the word "forming," as used in the claims, is used in its broadest sense and is not to be limited to an operation performed by a "forming tool," although the use of a forming tool is the preferred method for producing the fitting.

While there has been described what is at present believed to be the preferred embodiments of the invention, it will be understood that various modifications may be made therein; and it is contemplated to cover in the appended claims all such modifications as fall within the true spirit and scope of the invention.

What is claimed is:

1. The method of securing a lubrication fitting to a supporting member comprising: forming a bore and a counter-bore in said member; forming a portion of the fitting that is to be received in the bore with a forward pilot portion substantially fitting said bore and a following annular shoulder intermediate the ends thereof of slightly greater diameter than said bore; forming a first annular recess of less diameter than said bore immediately adjacent said shoulder between said shoulder and said forward pilot portion; forming a polygonal shoulder immediately adjacent said annular shoulder at the other end thereof with the radial distance from the axis of the shank to the corners of said polygonal shoulder being greater than the radius of said counter-bore, the sides of said polygonal shoulder being parallel to the fitting axis and of a length at least as great as the depth of the counterbore and its least diameter not substantially less than the diameter of said counter-bore, and forming a second recess in said annular shoulder immediately adjacent said polygonal shoulder and between said annular shoulder and said polygonal shoulder, and forcing the shank portion of said fitting into said bore and counterbore causing the annular shoulder to swage material surrounding said bore substantially uniformly into said first recess to form a seal and substantially simultaneously causing said polygonal shoulder to imbed the corners thereof into the material surrounding the counter-bore and to swage a part of said last-mentioned material into said second recess.

2. The method of securing a lubrication fitting to a supporting member comprising: forming a bore and a counter-bore in said member; forming a portion of the fitting that is to be received in the bore with a forward pilot portion substantially fitting said bore and a following annular shoulder of slightly greater diameter than the bore; forming an annular recess of less diameter than said bore in the fitting immediately adjacent said shoulder between said pilot portion and said annular shoulder; forming a portion of the fitting that is to be received in the counter-bore with a non-circular shoulder with sides parallel to the fitting axis and of a length at least as great as the depth of the counter-bore and having its greatest diametral span greater than the diameter of the counterbore and its least diameter not substantially less than the diameter of said counterbore; forming a second recess in said annular shoulder immediately adjacent said non-circular shoulder and between said first shoulder and said non-circular shoulder; and forcing said fitting into said bore and counterbore causing the annular shoulder to swage material surrounding the bore substantially uniformly into said first-mentioned recess to form a seal and causing said non-circular shoulder to imbed a portion thereof into the material surrounding the counterbore and to swage part of said last-mentioned material into said second recess.

3. The method of securing a lubrication fitting, provided with a lubricant receiving channel adapted to receive a lubricant under pressure and having a surface which is subjected to the pressure of the lubricant acting axially of the fitting and provided with a threaded portion at outer end thereof adapted to receive a correspondingly threaded element which while being threaded will subject said fitting to torque acting circumferentially about said fitting, to a supporting member comprising: forming a bore and a counter-bore in said member; forming a portion of the fitting that is to be received in the bore with a forward pilot portion substantially fitting said bore and a following annular shoulder of slightly greater diameter than the bore; forming an annular recess of less diameter than said bore on the fitting immediately adjacent said shoulder between said pilot portion and said annular shoulder; forming a portion of the fitting that is to be received in the counter-bore with a hexagonal shoulder having the distance between its diametrically opposite corners greater than the diameter of the counter-bore and its least diameter not substantially less than the diameter of said counter-bore with the sides of said hexagonal shoulder parallel to the fitting axis and of a length at least as great as the depth of the counter-bore; forming a second annular recess in said annular shoulder immediately adjacent said hexagonal shoulder and between said annular shoulder and said hexagonal shoulder; and forcing said fitting into said bore and counter-bore, causing the annular shoulder to swage material surrounding said bore substantially uniformly into said first-mentioned recess to form a seal and causing said hexagonal shoulder to imbed the corners thereof into the material surrounding the counter-bore and to swage material surrounding the counter-bore into said second recess.

4. The method of securing a lubrication fitting to a supporting member comprising: providing a hexagonal bar; using a forming tool to form a shank portion on said bar, a groove at one end thereof immediately adjacent the unworked hexagonal section, an annular shoulder immediately adjacent said groove, a second annular groove immediately adjacent said shoulder, and a cylindrical portion of smaller diameter than said shoulder extending from said second groove to the other end thereof; providing an axial lubricant passageway in said bar; forming a bore in the supporting member of a diameter slightly smaller than the diameter of said shoulder and substantially equal in diameter to said cylindrical portion of said bar; forming a counter-bore in the supporting member adjacent said bore of a diameter not substantially greater than the least diameter of said hexagonal section but less than the greatest diametral span of said hexagonal section, the height of said hexagonal section being at least as great as the depth of said counter-bore and said hexagonal section having side portions parallel to the fitting axis; and forcing said bar into said bore and counter-bore, causing said shoulder to swage material surrounding the bore substantially uniformly into said second recess to form a seal and causing the hexagonal section adjacent the shank portion to imbed itself into the material surrounding the counterbore and to swage material surrounding said counter-bore into the first mentioned recess.

References Cited in the file of this patent

UNITED STATES PATENTS

| | | |
|---|---|---|
| 1,919,552 | Hasselquist | July 25, 1933 |
| 1,946,065 | Dodge | Feb. 6, 1934 |
| 1,953,564 | Nemetz | Apr. 3, 1934 |
| 1,996,795 | Dodge | Apr. 9, 1935 |
| 2,010,569 | Sitzler | Aug. 6, 1935 |
| 2,025,224 | Dodge | Dec. 24, 1935 |
| 2,685,320 | Rosan | Aug. 3, 1954 |